United States Patent [19]

Furuno

[11] Patent Number: 5,086,508
[45] Date of Patent: Feb. 4, 1992

[54] RADIO TRANSCEIVER WITH TRANSMISSION LEVEL CONTROL

[75] Inventor: Kenichi Furuno, Hyogo, Japan

[73] Assignee: Mitsubishi Denki Kabushiki Kaisha, Tokyo, Japan

[21] Appl. No.: 432,862

[22] Filed: Nov. 7, 1989

[30] Foreign Application Priority Data

Apr. 10, 1989 [JP] Japan ................................. 1-88105

[51] Int. Cl.$^5$ ............................................. H04B 7/00
[52] U.S. Cl. ...................................... 455/69; 455/115; 455/127
[58] Field of Search ................... 455/69, 88, 115, 127, 455/226, 343, 92

[56] References Cited

U.S. PATENT DOCUMENTS

| | | | |
|---|---|---|---|
| 4,613,990 | 9/1986 | Halpern | 455/69 |
| 4,709,404 | 11/1987 | Tamura et al. | 455/127 |
| 4,825,193 | 4/1989 | Siwiak et al. | 455/127 |
| 4,910,792 | 3/1990 | Takahata et al. | 455/69 |

FOREIGN PATENT DOCUMENTS

| | | | |
|---|---|---|---|
| 3312112 | 10/1984 | Fed. Rep. of Germany | 455/127 |
| 6060321 | 3/1987 | Japan | 455/127 |
| 62-61231 | 11/1987 | Japan | 455/127 |

*Primary Examiner*—Curtis Kuntz
*Assistant Examiner*—Edward Urban
*Attorney, Agent, or Firm*—Rothwell, Figg, Ernst & Kurz

[57] ABSTRACT

A radio transceiver includes a control section for setting a transmitting output level higher or lower than a prescribed output level within a tolerance range, in response to a signal from a level conversion circuit. The level conversion circuit may designate a lower transmitting output level to reduce power consumption, and may designate a higher transmitting output level in the presence of high noise levels.

15 Claims, 12 Drawing Sheets

RADIO TRANSCEIVER WITH TRANSMISSION LEVEL CONTROL

BACKGROUND OF THE INVENTION

1. Field of the Invention

The present invention relates to a radio transceiver whose output level is specified by a base station, for example, and which transmits a transmitting signal at a specified output level to the base station or other destination.

2. Description of the Prior Art

Figure 1:
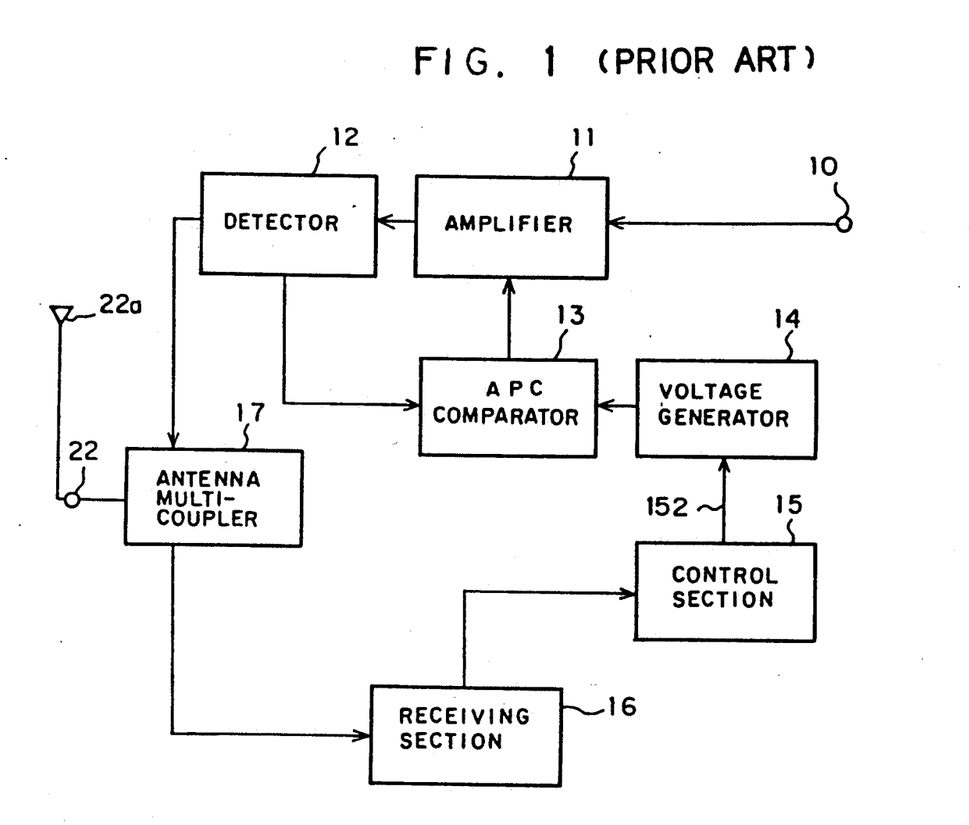
FIG. 1 is a block diagram showing the transmitting output control section of a radio transceiver of a conventional type.

FIG. 1 is a block diagram showing a transmitting output control section for an automobile telephone set of a conventional type. In the figure, 10 is a transmitting signal input terminal at which a transmitting signal is to be received; 11 is an amplifier for amplifying the transmitting signal; 12 is a detector (transmitting power detecting means) which detects the level of an output signal of the amplifier 11; 13 is an automatic power control comparator (hereinafter referred to as APC comparator) which constitutes a transmitting power control means in which a DC voltage output by the detector 12 and an output of a voltage generator,14, to be explained later, are compared; the voltage generator 14 (transmitting power control means) outputs a reference voltage based on a selection signal 152; 15 is a control section which develops selection signal 152 converted from the level information to the voltage generator 14; 16 is a receiving section which demodulates an input signal; 17 is an antenna multicoupler which supplies an amplified transmitting signal from the detector 12 to an antenna input-output terminal 22 and also supplies a received signal from the antenna input-output terminal 22 to the receiving section 16.

The operation is explained in the following. An input signal sent out from a base station or the like (hereinafter referred to as simply a base station) is inputted to the input-output terminal 22 and through the antenna multicoupler 17 to the receiving section 16. The input to the input-output terminal 22 may be from a separate antenna 22a.

The receiving section 16 demodulates the input signal and outputs transmitting output level information (hereinafter referred to as level information) to the control section 15. The level information which is contained in a demodulated signal specifies the output level of the transmitting signal (transmitting output level).

The control section 15 develops a selection signal 152 from the level information and outputs signal 152 to the voltage generator 14. The selection signal 152 differs from the level information only in the data format, otherwise containing substantially the same information.

The transmitting signal is inputted to the transmitting signal input terminal 10, amplified by the amplifier 11 and supplied to the antenna 22a through the detector 12, the antenna multicoupler 17 and the antenna input-output terminal 22. The detector 12 detects an amplified transmitting signal level and generates a DC voltage corresponding to the transmitting output level. The signal passes through filter capacitor 12a and charges capacitor 12d according to the RC time constant determined by resistor 12c. A diode 12b is provided to prevent negative components of the AC signal from amplifier 11 from affecting the charging of the capacitor 12d. The voltage generator 14 generates a specified voltage corresponding to the output level specified by the base station as represented by selection signal 152. The APC comparator 13 compares the DC voltage and the specified voltage and adjusts the amplification factor (gain) of the amplifier 11 so that both voltages are in balance.

Figure 2:
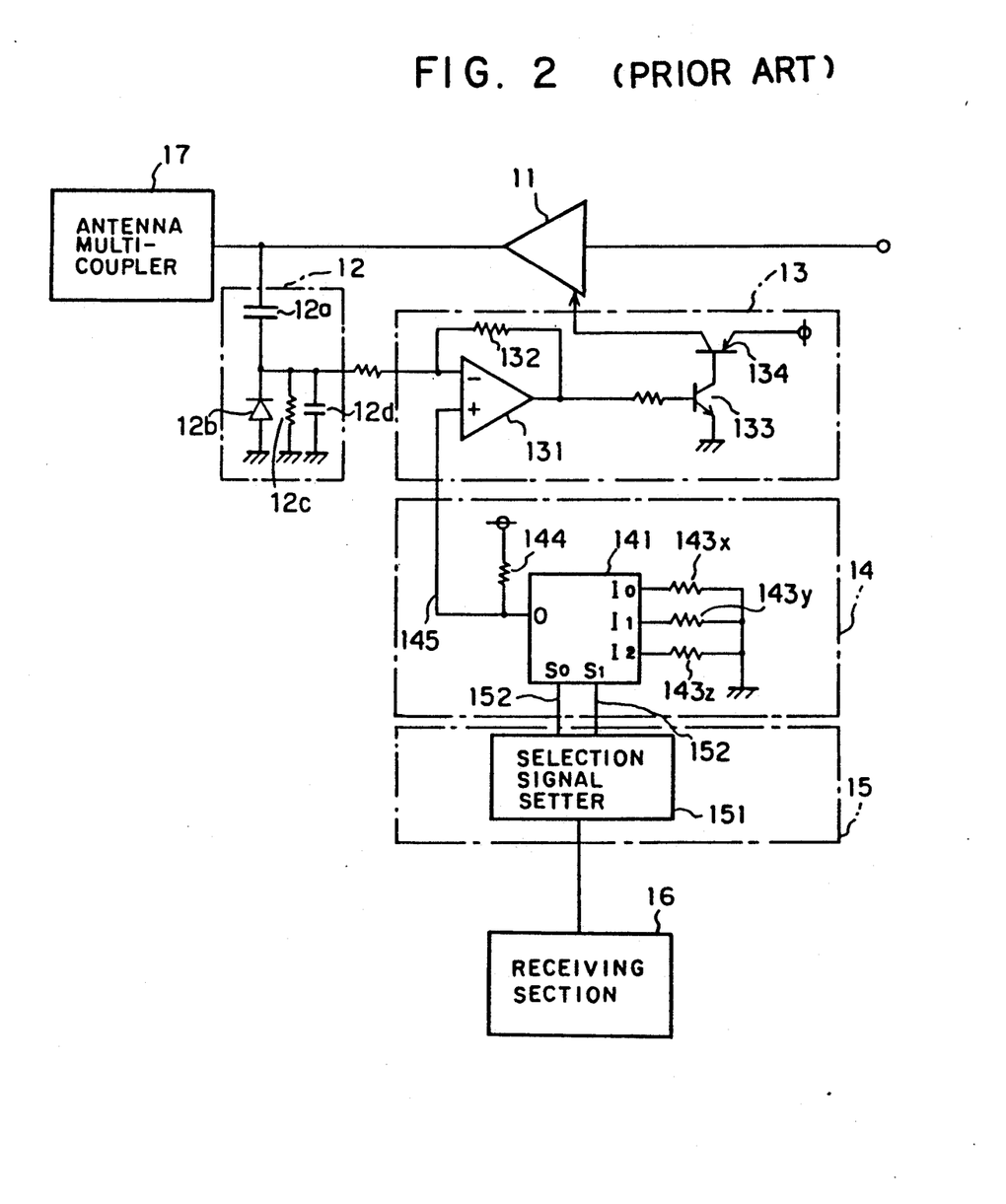
FIG. 2 shows a circuit diagram showing the detailed configuration of each block shown in FIG. 1.

FIG. 2 is a circuit diagram showing detailed configurations of the detector 12, the APC comparator 13, the voltage generator 14 and the control section 15. The component parts in the figure are explained as follows. 131 is an operational amplifier for changing the amplification factor of the amplifier 12; 132 is a feedback resistor; 133 and 134 are transistors for amplifying the output of the operational amplifier 131; 141 is a selector for selecting one of the resistors 143x to 143z; 151 is a selection signal setter which receives the level information from the receiving section 16 and converts it to a selection signal for selecting a corresponding resistor among the resistors 143x to 143z; 144 is a resistor which is used together with resistors 143x to 143z, for setting a reference voltage 145 which is connected to a non-inversion input terminal of the operational amplifier 131.

Next the operation will be explained. The values of the resistors 143x to 143z, resistor 144 and a feedback resistor 132 are so selected that the amplification factor of the amplifier 11 can be set to correspond to each of the plural levels dictated by the level information. In this state, the selection signal setter 151 outputs a selection signal 152 for selecting one of the resistors 132x to 143z which develops a reference voltage proportional to the amplification factor corresponding to the level information received from the receiving section 16. The selector 141 selects one of the resistors 143x to 143z based on the selection signal 152. If the resistor 143x, for example, is selected, a generated voltage divided by the ratio between the resistor 144 and the resistor 143x becomes the output reference voltage of the voltage generator 14. The operational amplifier 131 produces an output signal which, through feedback connection of resistor 132, changes the amplification factor of amplifier 11 until the input voltage at the inversion input terminal, that is, the voltage output by detector 12, is equal to the reference voltage, and the amplification factor of the amplifier 11 is determined based on the output signal of operational amplifier 131. When level information designating a different transmitting output level is input, a selection signal 152 for selecting another resistor 143y or 143z is output to the selection signal setter 151.

In this way, an amplification factor corresponding to one of these plural levels of the level information is selected, and a transmitting output level is determined by controlling the gain of amplifier 11 as designated by the level information. The number of levels of the level information is assumed to be three to simplify the explanation; that is, the number of steps of the output voltage of the voltage generator 14 is assumed to be three but actually the proper number of steps corresponding to the system requirements will be used.

Figure 3:
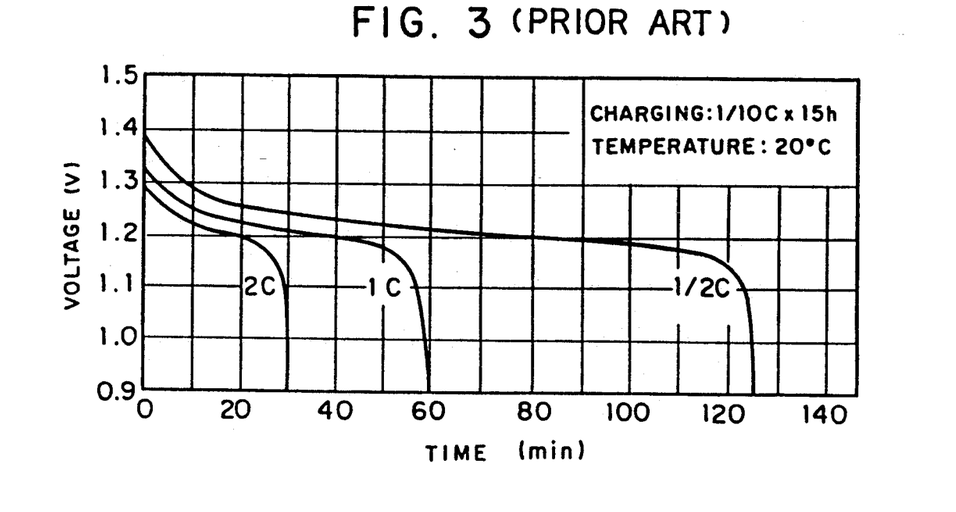
FIG. 3 is a characteristic chart showing the discharge characteristics of a battery.

FIG. 3 shows an example of discharge characteristics of a battery which can be used for this transceiver. In the figure, "C" means the battery capacity in amperehours and a discharge rate of 1C represents a discharge current flow that will discharge the battery in one hour. When the current consumption is 2C, the usable time duration of the battery becomes about half in comparison with the case where the current consumption is 1C.

The conventional types of transceivers are constituted as mentioned above; therefore, even if each level has an allowable tolerance range for the reference value, the transmitting output at each level is a fixed level corresponding to the level information, and an increase or decrease in the transmitting output level is not possible, so that lowering the power consumption or raising the transmitting output level in the range of tolerance when the noise level is high is not possible. These have been problems in the conventional prior art equipment. Similar prior art is described in Japanese laid-open Patent Application No. 97020/88.

SUMMARY OF THE INVENTION

An object of the present invention is to solve the problems described in the above and to provide a transceiver in which the power consumption of the transmitting section can be decreased and also the transmitting output level can be raised in the range of tolerance.

A transceiver according to the present invention comprises: an amplifier for amplifying a transmitting signal; a transmitting power detecting means which detects the output level of the amplifier; a receiving section which outputs the transmitting output level information for designating the transmitting output level contained in the demodulated input signal; a converting means which designates the output level of the amplifier to be a different transmitting output level in the range of tolerance from the transmitting output level designated by the transmitting output level information; a control section which outputs a transmitting output selection signal for selecting a new transmitting output level corresponding to a designated transmitting output level based on the transmitting output level information and a designating signal from the converting means; a transmitting power control means which sets the amplifier to have an amplification factor for making the output level of the amplifier equal to a transmitting output level selected by the transmitting output selection signal by inputting the output signal of the transmitting power detecting means and the transmitting output selection signal.

PREFERRED EMBODIMENTS OF THE INVENTION

Figure 4:
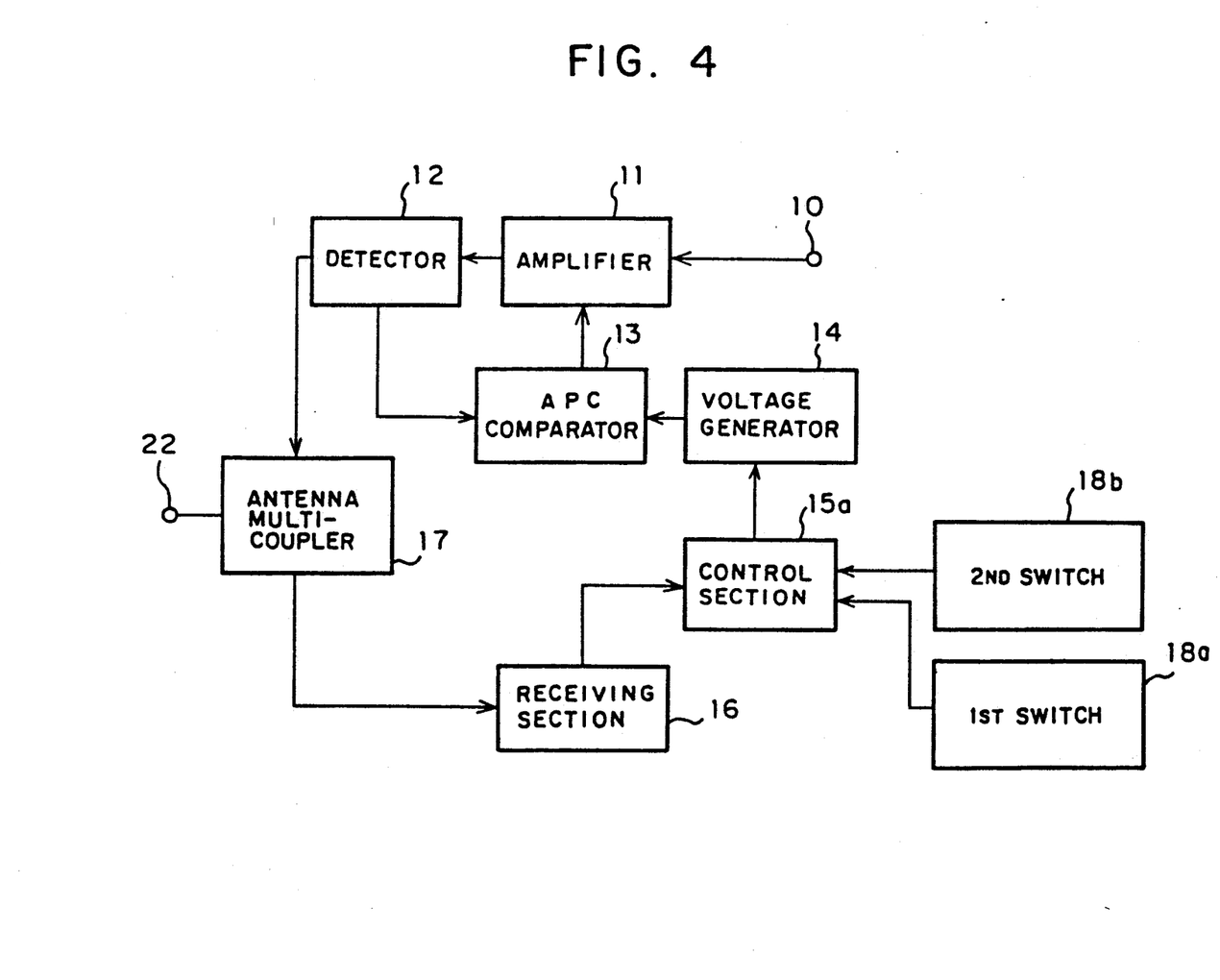
FIG. 4 is a block diagram showing the transmitter control section of the radio transceiver according to a first embodiment of the present invention.

An embodiment of the present invention will now be explained with reference to the drawings. In FIG. 4, 15a is a control section which outputs a transmitting output selection signal; 18a is a selection switch for lowering power consumption (hereinafter referred to as a first switch) which gives a designation to the control section 15a to lower the transmitting output level; 18b is a switch for increasing transmitting output (hereinafter referred to as a second switch) which gives a designation to raise the transmitting output level. The first switch 18a and the second switch 18b are components of a level conversion designating means. The other component parts are denoted with the same numbers shown in FIG. 1.

Figure 5A:
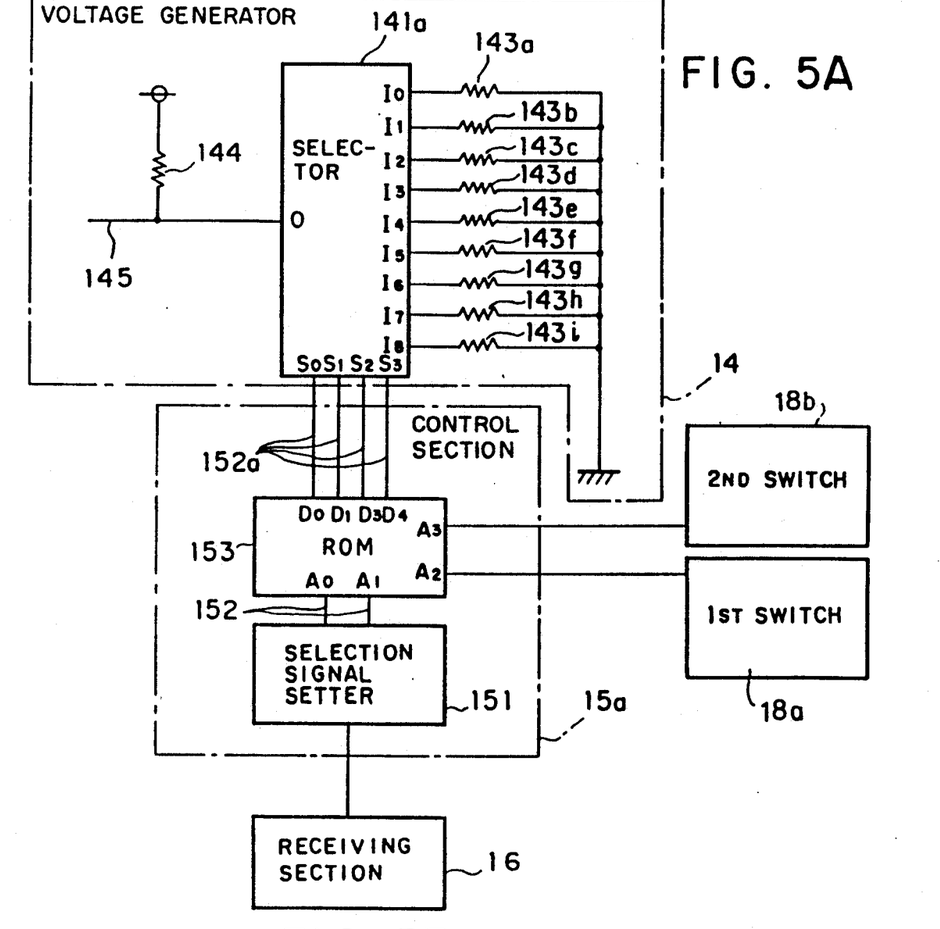
FIG. 5A is a circuit diagram showing the detailed configurations of the voltage generator and the control section shown in FIG. 4.

FIG. 5A is a circuit diagram showing detailed configurations of the voltage generator 14 and the control section 15a. In the figure, 141a is a selector for selecting one of the resistors 143a to 143i; 153 is a ROM whose address inputs are signals input from the first switch 18a and the second switch 18b, and a selection signal 152 output from a selection signal setter 151; 152a is the output signal of the ROM 153. The output signal 152a of the ROM 153 is a transmitting output level selection signal supplied to the voltage generator 14.

Figure 5B:
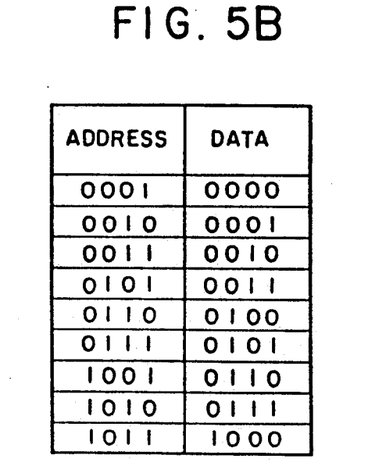
FIG. 5B is a table showing ROM data applicable to FIG. 5A.

Stored in the ROM 153 are data for selecting one of the resistors 143a to 143i for each address designated by the selection signal 152 output from the first switch 18a, the second switch 18b and the selection signal setter 151. For example, the data as shown in FIG. 5B are stored in ROM 153. Each of the resistors 143a to 143i has a resistance value which can set the amplification factor of the amplifier 11 to a reference value in each level or to a set value in the permissible tolerance range of the selected level.

The operation is explained as follows. In the condition where the first switch 18a and the second switch 18b are set to OFF, the control section 15a performs similar operation to that of a conventional device. In other words, the ROM 153 receives a two bit address selection signal 152 corresponding to one of three levels of level information output from the selection signal setter 151 and outputs one of data "0000" to "0010" as shown in FIG. 5B. According to the data, the selector 141a selects one of the resistors 143a to 143c. This means that the resistors 143a to 143c correspond, respectively, to the resistors 143x to 143z shown in FIG.

2. The voltage generator 14 outputs a voltage from the voltage divider formed by the resistor 144 and one of the resistors 143a to 143c as an output voltage 145.

When the first switch 18a is set to the ON state, the two bit address signal 152 is modified by a third bit set to "1" and one of the data values "0011" to "0101" is outputted from the ROM 153; and the selector 141a selects one of the resistors 143d to 143f.

Each of the resistors 143d to 143f has a selected resistance value such that the corresponding output level of the amplifier 11 is lower than the reference value but within the permitted tolerance range of the respective transmitting output levels. The voltage generator 14 outputs a voltage obtained by dividing the generated voltage with the resistor 144 and one of the resistors 143d to 143f as its output voltage 145.

In a manner similar to the above, when the second switch 18b is set to the ON state, the selection signal 152 is modified by a fourth bit set to "1" as shown in FIG. 5B and the selector 141a selects one of the resistors 143g to 143i. With the values of resistances 143a to 143c set to those corresponding to the rated values in each level, the values of resistances 143d to 143f are set in steps corresponding to lower values than the rated values within the permitted tolerance range. Since the values of resistances 143g to 143i are set to higher values than the rated values in each level in the tolerance range, if the first switch 18a is turned ON, the transmitting output level is lowered in steps in the tolerance range, and if the second switch 18b is turned ON, the transmitting level is raised in steps in the tolerance range. The number of rated levels is assumed to be 3 in this case, but the number can be varied according to the system in which the present invention is to be applied.

A system with a configuration in which only the first switch 18a is provided is also effective. In this case, a transmitting output level cannot be raised in the range of tolerance but there is an effect of decreasing power consumption.

Figure 6:
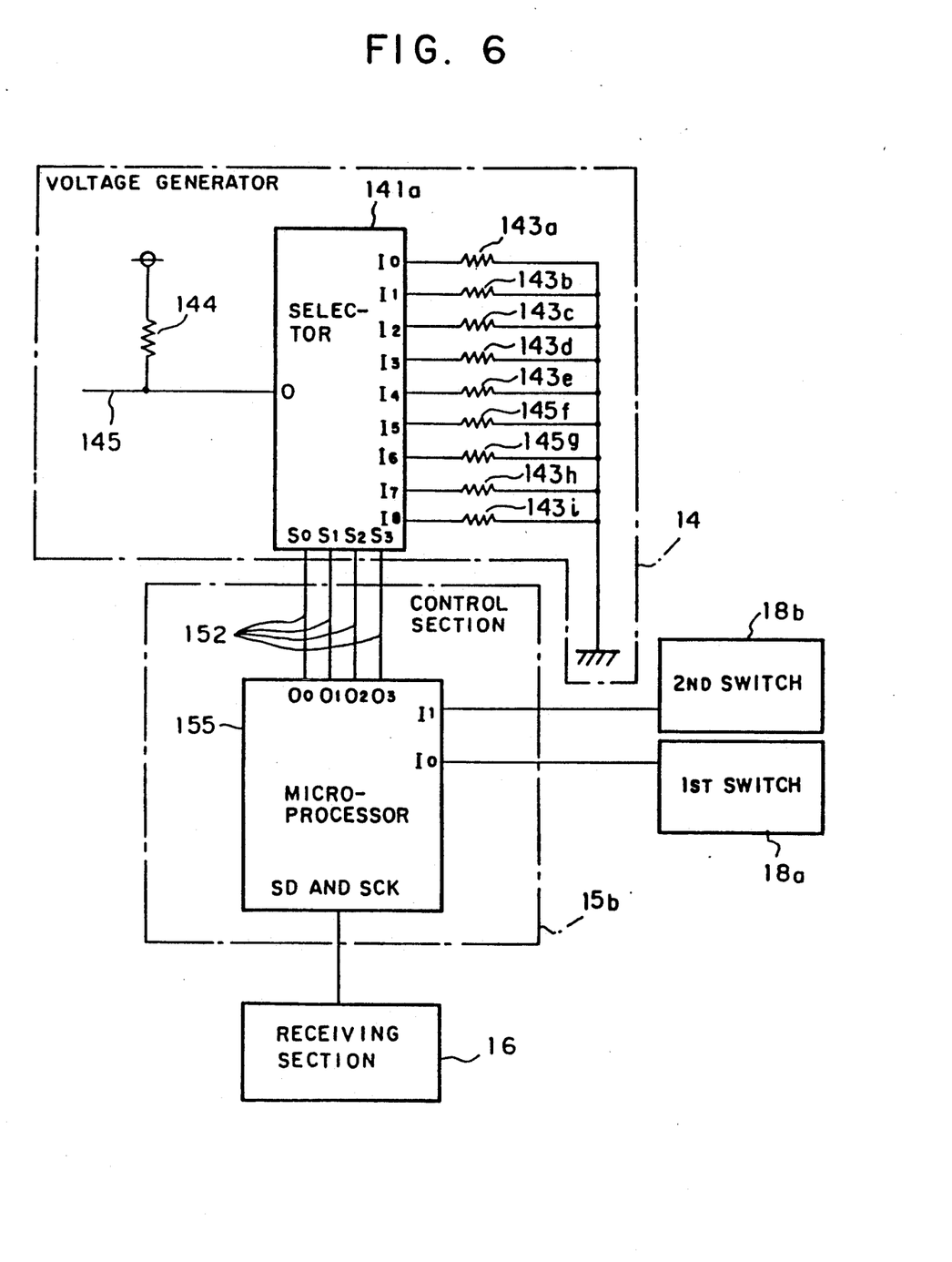
FIG. 6 is a circuit diagram showing the detailed configurations of the voltage generator and the control section of the radio transceiver according to a second embodiment of the present invention.
Figure 7:
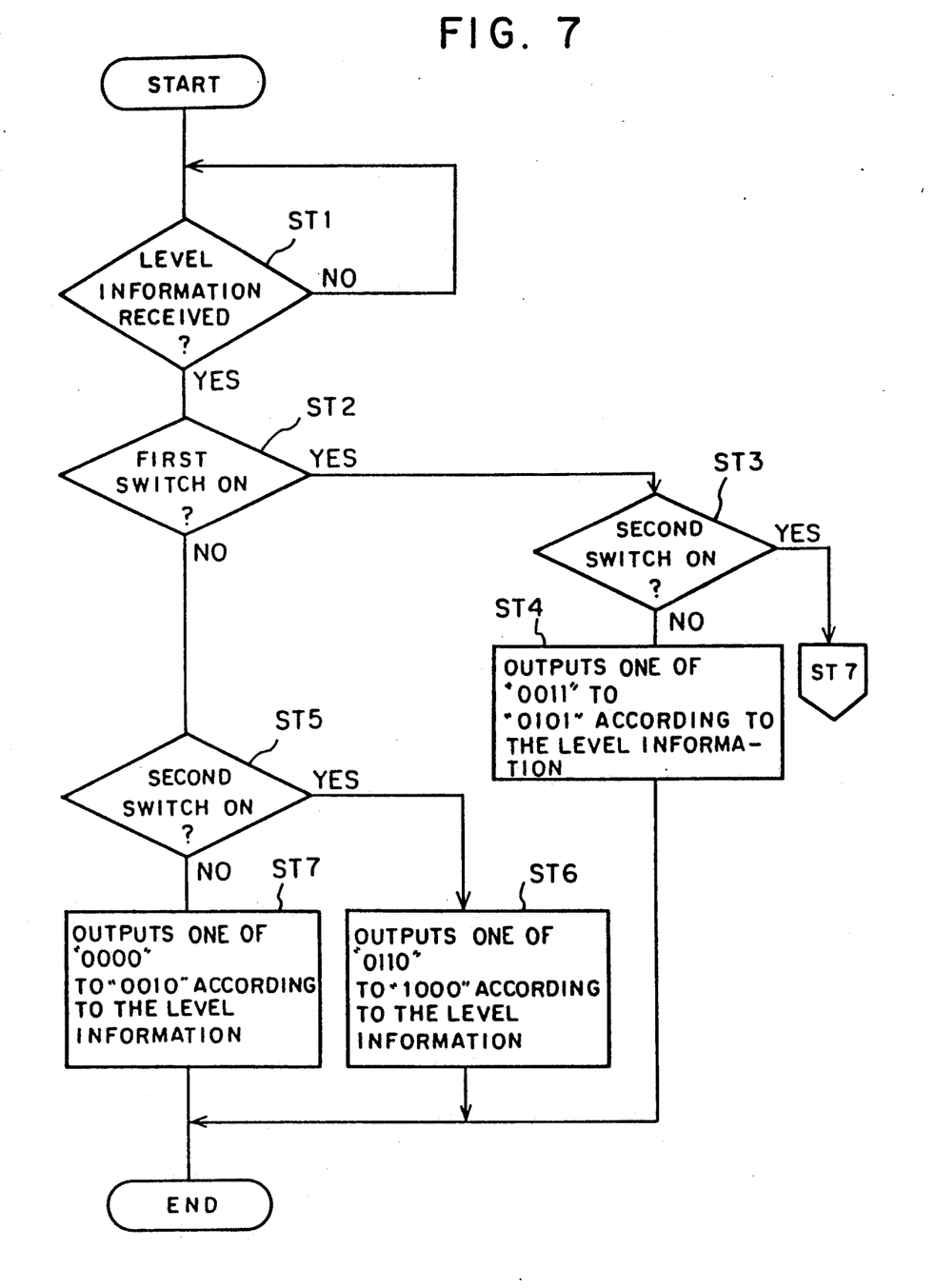
FIG. 7 is a flow chart showing the operation of the control section shown in FIG. 6.

FIG. 6 shows in detail the voltage generator 14 and the controller 15b of the radio transceiver according to a second embodiment of the present invention. FIG. 7 is a flow chart showing the operation of the control section 15b. In FIG. 6, 155 is a microprocessor in which an input-output port, a ROM storing a program and a RAM storing data are installed.

The microprocessor 155 receives level information from the receiving section 16 and stores it in the RAM (step ST1), and examines the input port. When it is detected that the first switch 18a is ON and the second switch is OFF (step ST2, ST3), the microprocessor outputs one of "0011" to "0101" as shown in FIG. 5B corresponding to the level information (step ST4) from the output port.

The selector 141a responds to the transmitting output selection signal 152 by selecting the corresponding one of the resistors 143d to 143f. In the case where the first switch 18a is turned OFF and the second switch 18b is turned ON (step ST2, ST5), one of "0110" to "1000" as shown in FIG. 5B is output according to the level information (step ST6). When both switches are turned OFF or ON, one of "0000" to "0010" is output according to the level information (step ST7). In this embodiment, the condition in which both switches are turned ON is regarded as cancelling out the switching functions. The same effect can be obtained in the embodiment of FIG. 5A by making the data in addresses "1101" to "1111" of ROM 153 to be the same as the data in addresses "0001" to "0011".

Figure 8:
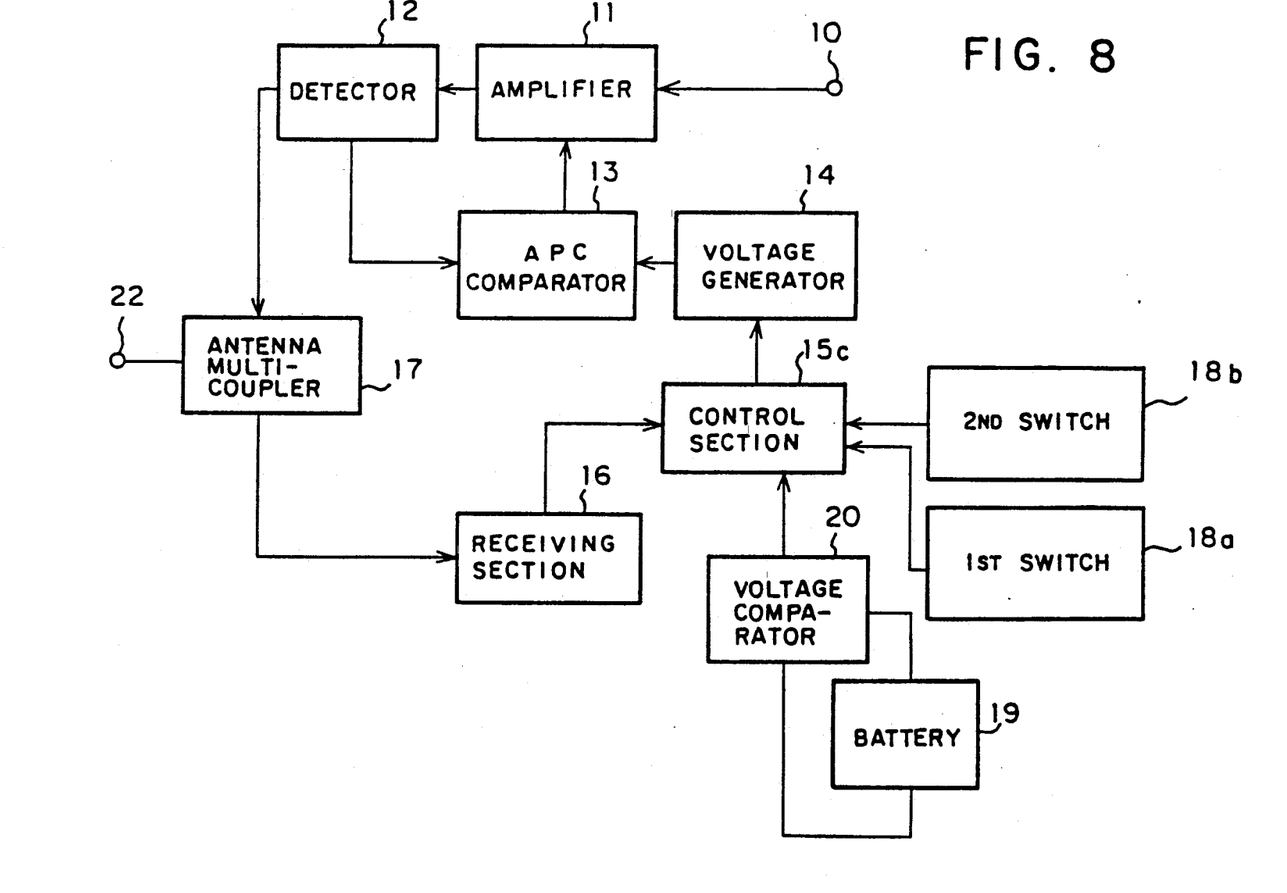
FIG. 8 is a block diagram showing the transmitting output control section of the radio transceiver according to a third embodiment.
Figure 9:
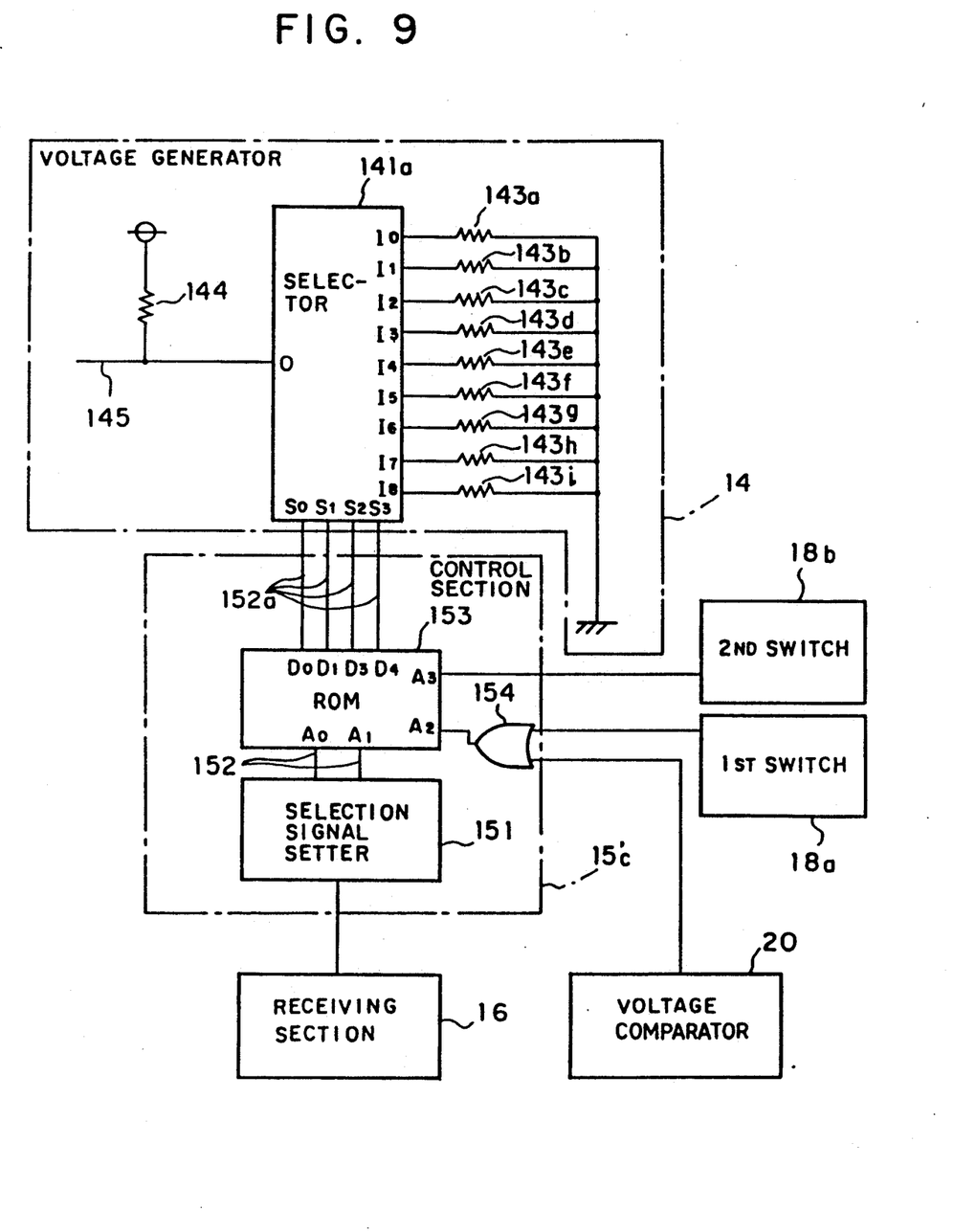
FIG. 9 is a circuit diagram showing detailed configurations of the voltage generator and the control section shown in FIG. 8.

FIG. 8 shows the transmitting output control section of the radio transceiver according to a third embodiment of the present invention. In the figure, 19 is a battery and 20 is a voltage comparator which detects the output voltage of the battery 19. In this case, as shown in FIG. 9, the output signal of the voltage comparator 20 and the output signal of the first switch 18a are gated in an OR circuit 154 in the control section 15c.

The arrangement is such that when the output voltage of the battery 19 becomes lower than a specified value, the output signal of the voltage comparator is set to ON, thereby providing an ON signal to one input of the OR gate 154 and setting the system to operate in the same manner as when first switch 18a is ON. In the arrangement as described above, when the output voltage of the battery 19 becomes low, the transmitting output level is automatically adjusted to be lower than the reference value in the tolerance range. As a result, the usable time of the battery 19 can be extended. The control section 15c can also be formed with a microprocessor as in the case of the second embodiment.

Figure 10:
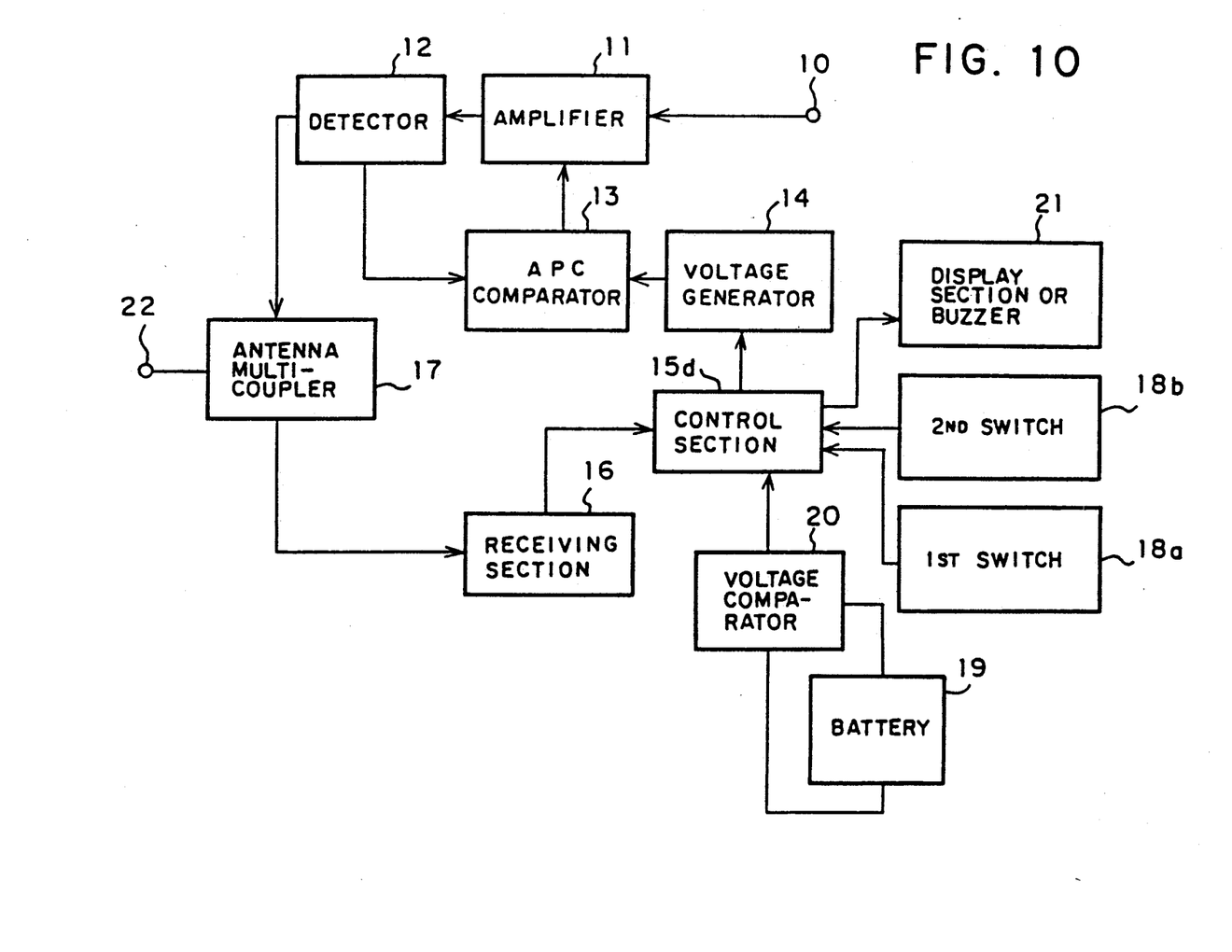
FIG. 10 is a block diagram showing the transmitting output control section of the radio transceiver according to a fourth embodiment of the present invention in which a display and/or buzzer 21 is added to the embodiment of FIG. 8.

FIG. 10 shows a fourth embodiment of the present invention in which a display section and/or a buzzer 21 is added to the configuration shown in FIG. 8. In this case, when the output signal of the voltage comparator 20 is ON, the control section 15d can display the low output voltage of the battery 19 in the display section 21, and/or it can activate the buzzer to signal that the output voltage is low. The display and/or buzzer 21 can also notify the user when the switches 18a and 18b are turned ON or OFF. If the first switch 18a is eliminated from the configuration shown in FIG. 10 as a modified embodiment, when the output signal of the voltage comparator 20 is ON, the control section 15d outputs a transmitting output selection signal 152a to the voltage generator 14 which makes the transmitting output level lower than the reference value and also the lowering of the output voltage is notified by the display section or buzzer 21.

Figure 11:
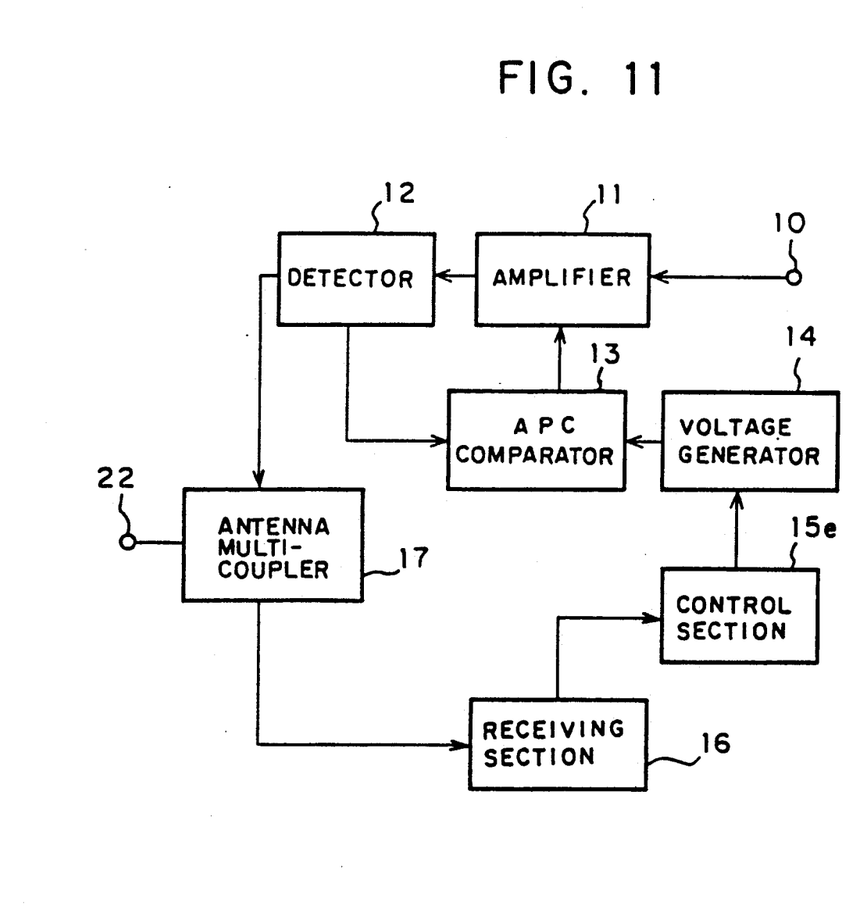
FIG. 11 is a block diagram showing the transmitting output control section of the radio transceiver according to a fifth embodiment of the present invention.
Figure 12:
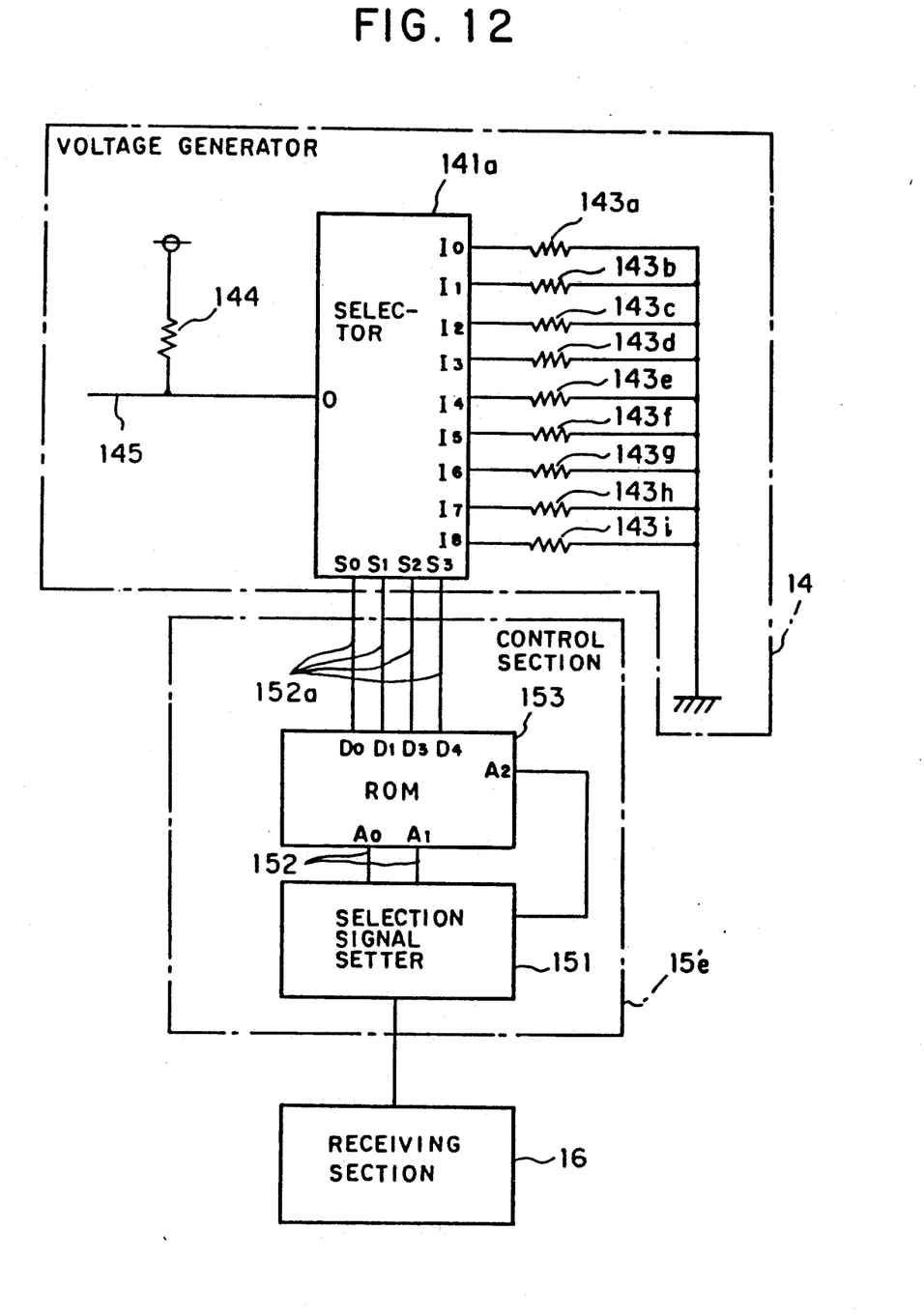
FIG. 12 is a circuit diagram showing detailed configurations of the voltage generator and the control section shown in FIG. 11.
Figure 13A:
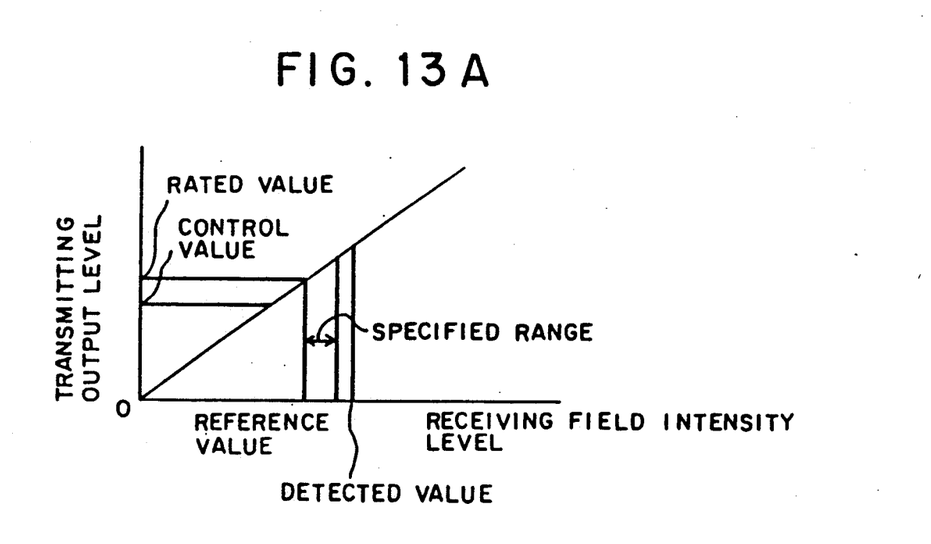
FIG. 13A is a graphical chart showing the relation between receiving point field intensity levels and transmitting output levels.

FIG. 11 is a block diagram showing a fifth embodiment of the present invention. This embodiment takes advantage of the fact that a lower transmitting level can be used when the receiving station is relatively close in range. This can be determined by detecting the field intensity level of a signal transmitted from the receiving station. The output signal of a detecting circuit of a received signal field intensity level provided in the receiving section 16 is introduced to a control section 15e, and as shown in FIG. 12, all the data signals of a ROM 153 are output from the control section 15e. As shown in FIG. 13A, when the received signal field intensity level is higher than the reference value, a transmitting output selection signal 152a which makes the transmitting output level lower than the rated level within the tolerance range is output automatically to the voltage generator 14.

Figure 13B:
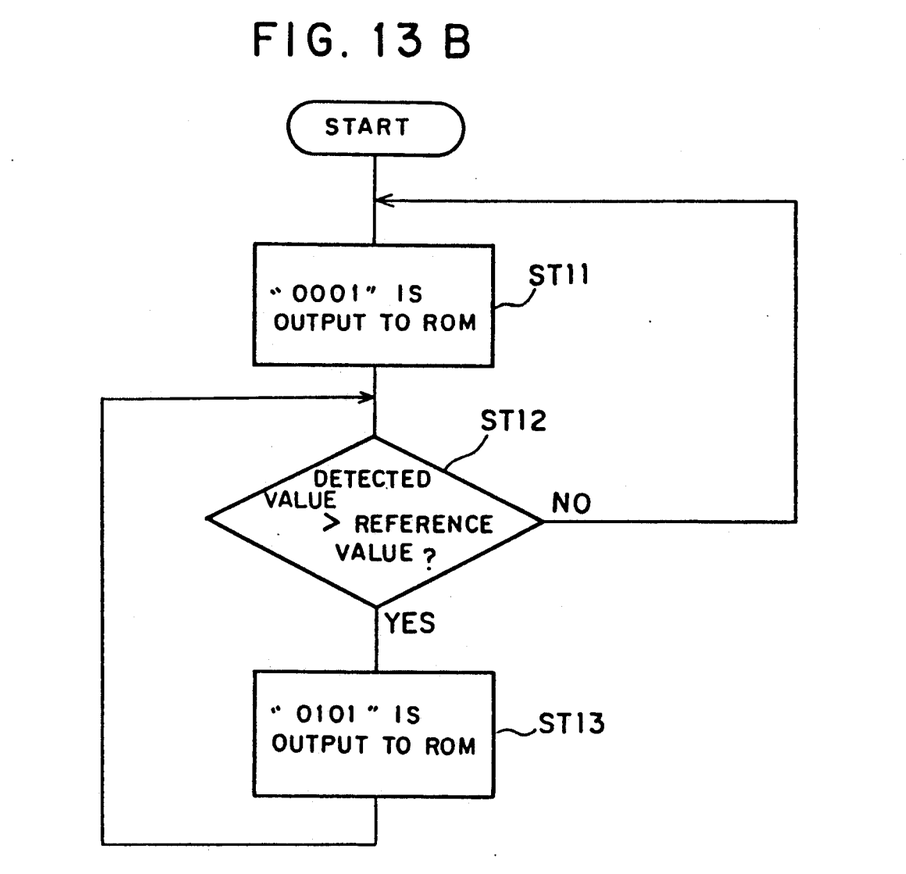
FIG. 13B is a flow chart showing the operation of the control section shown in FIG. 12.

FIG. 13B is a flow chart showing the operation of the control section 15e when the resistor 143a, is selected as a resistor corresponding to a reference value.

At first, a transmitting output selection signal 152a is output for selecting a resistor 143a so that the transmitting output level may become equal to a rated level. In other words, an address signal "0001" is output to make the output signal of the ROM 153 be "0000" (step ST11). If a received signal field intensity level is higher than a reference value plus tolerance at the time (step ST12), an address signal "0101" is output to the ROM 153 (step ST13). Then the ROM 153 outputs the data "0011" and the selector 141a selects the resistor 143d. As a result of the above, the transmitting output level is lowered in the tolerance range. In this embodiment, as the level conversion designating means, a detecting circuit for detecting received signal field intensity level provided in the receiving section 16 and a comparator for comparing a reference value with a detected value in the control section 15e are utilized. The control section 15e can be implemented by a microprocessor as in the case of the second embodiment.

As described in the above, a transmitting output level of a radio transceiver according to the present invention, can be made higher or lower than each of the reference levels within the tolerance range in each level by the level conversion designating means; thereby the power consumption of a transceiver can be lowered and the transmitting output level can be raised when noise level is high.

What is claimed is:

1. A radio transceiver comprising:
   an amplifier for amplifying a transmitting signal at a variable transmitting output power level;
   transmitting power detecting means for detecting the transmitting output power level of said amplified transmitting signal;
   receiver means including means for receiving and for outputting transmitting output power level information contained in a received signal, which designates a specified transmitting output power level within a prescribed tolerance range;
   level conversion means for outputting a conversion signal designating a transmitting output power level modified from said specified transmitting output power level but within said prescribed tolerance range;
   control means responsive to said transmitting output power level information and said conversion signal for outputting a transmitting output power selection signal corresponding to said specified transmitting output power level designated by said level information as modified by said level conversion signal; and
   transmitting power control means responsive to said transmitting output power selection signal and said detected transmitting output power level for setting the amplification factor of said amplifier to control the transmitting output power of said transceiver at the power level specified by said transmitting output power selection signal outputted by said control means.

2. A radio transceiver according to claim 1, wherein:
   said transmitting power detecting means includes a detector circuit comprising capacitance means for storing a DC voltage proportional to the output level of said amplified signal;
   said transmitting power control means includes a voltage generator having a selector for selecting one of a plurality of resistors corresponding to said transmitting output selection signal, the selected resistor forming part of a voltage divider for producing a reference voltage corresponding to said transmitting output selection signal; and
   a comparator for automatic gain control which controls the amplification factor of said amplifier to make said DC voltage output of said detector equal to said reference voltage.

3. A radio transceiver according to claim 2, wherein the comparator for automatic gain control comprises an operational amplifier having a noninversion input terminal for receiving said reference voltage and an inversion input terminal for receiving the output voltage of said detector.

4. A radio transceiver according to claim 1 wherein said level conversion means includes a first switch which outputs a signal designating a reduction of the transmitting output level designated by said output power level information.

5. A radio transceiver according to claim 4, wherein said level conversion means comprises a second switch which outputs a signal designating an increase of the transmitting output level designated by said level information.

6. A radio transceiver according to claim 5, wherein said control means comprises a ROM which is connected to receive said transmitting output level information, said signal output from said first switch and said signal output from said second switch as address inputs and outputs a transmitting output selection signal stored at the address indicated by said address inputs.

7. A radio transceiver according to claim 5, wherein the level conversion comprises a voltage comparator which detects the output voltage of a battery and outputs a signal when the output voltage is lower than a predetermined level, and an OR circuit which performs a logical OR operation on said output signal from said first switch and said output signal from said voltage comparator.

8. A radio transceiver according to claim 4, wherein said control means comprises a ROM which is connected to receive said transmitting output level information and said signal output from said first switch as address inputs, and outputs a transmitting output selection signal stored at the address indicated by said address input.

9. A radio transceiver according to claim 4, wherein said control means comprises a programmable microprocessor which receives as inputs said transmitting level information and said signal output by said first switch, and outputs a transmitting output selection signal corresponding to said inputs.

10. A radio transceiver according to claim 5, wherein said control means comprises a programmable microprocessor which receives as inputs said transmitting output level information, said signal output from said first switch and said signal output from said second switch, and outputs a transmitting output selection signal in response to said inputs.

11. A radio transceiver according to claim 4, wherein the level conversion means comprises a voltage comparator which detects the output voltage of a battery and outputs a signal when the output voltage is lower than a predetermined level, and an OR circuit which performs a logical OR operation on said output signal from said first switch and said output signal from said voltage comparator.

12. A radio transceiver according to claim 11, further comprising an alarm means including at least one of a display section and a buzzer, wherein said control means detects the output signal of said voltage comparator and activates said display section or said buzzer in response thereto.

13. A radio transceiver according to claim 1, wherein the level conversion means comprises a field intensity detecting circuit for detecting the field intensity of a received signal; and
    means provided in said control means for outputting a signal designating a reduction of the transmitting output level when a received signal field intensity level detected by the field intensity detecting circuit is higher than a predetermined reference level.

14. A radio transceiver according to claim 13, wherein said control means comprises a ROM which is connected to receive said reduction designating signal and said transmitting output level information as address inputs, and outputs a transmitting output selection signal stored at the address indicated by said address inputs.

15. A radio transceiver according to claim 13, wherein said control means comprises a programmable microprocessor which receives as inputs said reduction designating signal and said transmitting output level information, and outputs a transmitting output selection signal in response to said inputs.

* * * * *

UNITED STATES PATENT AND TRADEMARK OFFICE
CERTIFICATE OF CORRECTION

PATENT NO. : 5,086,508
DATED : February 4, 1992
INVENTOR(S) : Kenichi Furuno

It is certified that error appears in the above-indentified patent and that said Letters Patent is hereby corrected as shown below:

Col. 8, line 3, "noninversion" should be -- non-inversion --; Col. 8, line 15, after "by said" insert -- output power --; Column 8, line 61, "11" should be --7 --.

Signed and Sealed this

Twelfth Day of April, 1994

Attest:

BRUCE LEHMAN

Attesting Officer

Commissioner of Patents and Trademarks